US012611613B2

(12) United States Patent
Kang et al.

(10) Patent No.: US 12,611,613 B2
(45) Date of Patent: Apr. 28, 2026

(54) GAS CAPTURE SYSTEM

(71) Applicants: HYUNDAI MOTOR COMPANY, Seoul (KR); KIA CORPORATION, Seoul (KR); AIRRANE CO., LTD., Cheongju-si (KR)

(72) Inventors: Woo Ram Kang, Suwon-si (KR); Jung Joo Park, Seoul (KR); Han Eol Song, Seongnam-si (KR); Seong Yong Ha, Seoul (KR); Chung Seop Lee, Daejeon (KR); Jin Hyuk Yim, Cheongju-si (KR); Eun Byeol Baek, Cheongju-si (KR)

(73) Assignees: HYUNDAI MOTOR COMPANY, Seoul (KR); KIA CORPORATION, Seoul (KR); AIRRANE CO., LTD., Cheongju-si (KR)

( * ) Notice: Subject to any disclaimer, the term of this patent is extended or adjusted under 35 U.S.C. 154(b) by 370 days.

(21) Appl. No.: 18/195,728

(22) Filed: May 10, 2023

(65) Prior Publication Data

US 2024/0173641 A1 May 30, 2024

(30) Foreign Application Priority Data

Nov. 25, 2022 (KR) ........................ 10-2022-0160807

(51) Int. Cl.
*B01D 53/22* (2006.01)
*B01D 1/00* (2006.01)
(Continued)

(52) U.S. Cl.
CPC .......... *B01D 1/2815* (2013.01); *B01D 1/0011* (2013.01); *B01D 1/2887* (2013.01);
(Continued)

(58) Field of Classification Search
CPC .. B01D 1/2815; B01D 1/0011; B01D 1/2887; B01D 1/289; B01D 1/2896; B01D 5/006; B01D 5/0075; B01D 5/009
See application file for complete search history.

(56) References Cited

U.S. PATENT DOCUMENTS 2,636,056 A * 4/1953 Jones ...................... C07C 13/15
585/803
4,121,917 A * 10/1978 Baker .................... F25J 3/0238
62/50.2

(Continued)

FOREIGN PATENT DOCUMENTS

CA 2613251 A1 * 1/2007 ......... B01D 53/1425
CN 103628982 B 9/2015
(Continued)

*Primary Examiner* — Anthony Shumate
(74) *Attorney, Agent, or Firm* — MCDONNELL BOEHNEN HULBERT & BERGHOFF LLP

(57) ABSTRACT

A gas capture system includes a first heat exchanger that exchanges heat between cold heat of a fuel that is vaporizing and a first gas mixture to cool the first gas mixture, a first dehumidifier that dehumidifies the first gas mixture cooled through the first heat exchanger, a first compressor that presses the first gas mixture passing through the first dehumidifier, a first separation device that separates a second gas mixture including a reference gas from the pressed first gas mixture, and a liquefier that liquefies the reference gas to generate a reference liquid.

18 Claims, 4 Drawing Sheets

(51) Int. Cl.
　　B01D 1/28　　　　(2006.01)
　　B01D 5/00　　　　(2006.01)
(52) U.S. Cl.
　　CPC ........... B01D 1/289 (2013.01); B01D 1/2896
　　　　(2013.01); B01D 5/006 (2013.01); B01D
　　　　5/0075 (2013.01); B01D 5/009 (2013.01)

(56) References Cited

U.S. PATENT DOCUMENTS

| | | | | | |
|---|---|---|---|---|---|
| 5,131,238 | A | * | 7/1992 | Meckler | F24F 1/00 62/271 |
| 5,181,387 | A | * | 1/1993 | Meckler | F24F 5/0035 62/93 |
| 6,196,021 | B1 | * | 3/2001 | Wissolik | F25J 1/0201 62/913 |

| | | | | | |
|---|---|---|---|---|---|
| 2008/0302133 | A1 | | 12/2008 | Saysset et al. | |
| 2020/0165970 | A1 | * | 5/2020 | Sinatov | F25J 1/004 |
| 2021/0121821 | A1 | * | 4/2021 | Ball | B01D 53/263 |
| 2021/0121822 | A1 | * | 4/2021 | Ball | B01D 53/1493 |
| 2021/0129074 | A1 | * | 5/2021 | Mashiko | C10L 3/102 |
| 2024/0254398 | A1 | * | 8/2024 | Reed | C12P 1/04 |

FOREIGN PATENT DOCUMENTS

| | | | | |
|---|---|---|---|---|
| CN | 104948246 | B | 2/2017 | |
| CN | 210159412 | U | 3/2020 | |
| JP | 2009-520595 | A | 5/2009 | |
| KR | 10-1149510 | B1 | 5/2012 | |
| KR | 10-2029193 | B1 | 11/2019 | |
| KR | 10-2222965 | B1 | 3/2021 | |
| KR | 10-2417218 | B1 | 7/2022 | |
| WO | WO-2023117704 | A1 * | 6/2023 | ......... B01D 53/1418 |
| WO | WO-2024043605 | A1 * | 2/2024 | ............. B01D 8/00 |

* cited by examiner

GAS CAPTURE SYSTEM

CROSS REFERENCE TO RELATED APPLICATIONS

This application claims the benefit of priority to Korean Patent Application No. 10-2022-0160807, filed in the Korean Intellectual Property Office on Nov. 25, 2022, the entire contents of which are incorporated herein by reference.

TECHNICAL FIELD

The present disclosure relates to a gas capture system.

BACKGROUND

In recent years, the demand for carbon neutrality is increasing to solve problems of global warming and abnormal climate caused by emission of greenhouse gases. To solve these problems, research on capturing carbon dioxide ($CO_2$) generated in various chemical processes so that the carbon dioxide ($CO_2$) is not released to the atmosphere is progress, but high cost is an obstacle to commercialization.

Examples of a technology for capturing carbon dioxide include an absorption method using a liquid solvent, an adsorption method using a solid adsorbent, a membrane separation method using a separator, and the like. Among them, the membrane separation method refers to a technology of selectively permeating carbon dioxide from a gas mixture to separate and capture the carbon dioxide. Materials of a membrane selectively permeating the carbon dioxide may include various materials such as a polymer, an inorganic material, and an organic-inorganic composite material, and in particular, a result of improving capture performance for the carbon dioxide at a low temperature has been reported.

Thus, in general, to improve efficiency of the membrane separation method, a cooler is used. Since separate electric power is required to drive the cooler, a technology for improving the efficiency of the membrane separation method without using the cooler is needed.

Meanwhile, a natural gas is a material used as a raw material and a fuel in various chemical processes and is generally stored after being liquefied under low temperature conditions for efficient storage and transportation. This liquefied natural gas (LNG) is vaporized again to be used as a raw material or a fuel, and cold heat generated in this case is generally discharged to the outside and discarded. Thus, a technology capable of utilizing the cold heat is needed.

SUMMARY

The present disclosure has been made to solve the above-mentioned problems occurring in the prior art while advantages achieved by the prior art are maintained intact.

An aspect of the present disclosure provides a gas capture system that may increase gas capture efficiency by utilizing cold heat generated when a fuel is vaporized.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, there is provided a gas capture system including a first heat exchanger that exchanges heat between cold heat of a fuel that is vaporizing and a first gas mixture to cool the first gas mixture, a first dehumidifier that dehumidifies the first gas mixture cooled through the first heat exchanger, a first compressor that presses the first gas mixture passing through the first dehumidifier, a first separation device that separates a second gas mixture including a reference gas from the pressed first gas mixture, and a liquefier that liquefies the reference gas to generate a reference liquid.

In another example, the gas capture system may further include a second dehumidifier that dehumidifies the first gas mixture discharged from the first compressor, wherein the first gas mixture passing through the second dehumidifier is introduced into the first separation device.

In still another example, the gas capture system may further include a second heat exchanger that exchanges heat between the cold heat of the fuel passing through the first heat exchanger and the first gas mixture discharged from the first compressor to cool the first gas mixture.

In yet another example, the first separation device may be cooled by heat exchange with the cold heat of the fuel passing through the second heat exchanger.

In yet another example, the gas capture system may further include a second separation device that separates the reference gas from the second gas mixture discharged from the first separation device, wherein the liquefier liquefies the reference gas discharged from the second separation device.

In yet another example, the gas capture system may further include a first pump that suctions the second gas mixture discharged from the first separation device, and a blower that generates flow in which the second gas mixture suctioned through the first pump to the second separation device.

In yet another example, the gas capture system may further include a third heat exchanger that cools the second gas mixture discharged from the blower, wherein the second gas mixture cooled by the third heat exchanger is introduced into the second separation device.

In yet another example, the gas capture system may further include a second heat exchanger that exchanges heat between the cold heat of the fuel passing through the first heat exchanger and the first gas mixture discharged from the first compressor to cool the first gas mixture, wherein the first separation device is cooled by heat exchange with the cold heat of the fuel passing through the second heat exchanger, and the third heat exchanger exchanges heat between the cold heat of the fuel passing through the first separation device and the second gas mixture to cool the second gas mixture.

In yet another example, the second separation device may be cooled by heat exchange with the cold heat of the fuel passing through the third heat exchanger, and the liquefier exchanges heat between the cold heat of the fuel passing through the second separation device and the reference gas to cool the reference gas.

In yet another example, the gas capture system may further include a second pump that suctions the reference gas discharged from the second separation device, and a second compressor that presses the reference gas suctioned through the second pump, wherein the reference gas passing through the second compressor is introduced into the liquefier.

In yet another example, the gas capture system may further include a first discharge flow path that is connected to the first separation device and guides, to an outside, a first residual gas generated by separating the second gas mixture from the first gas mixture.

In yet another example, the gas capture system may further include a first connection flow path which connects the first dehumidifier and the first compressor and through which the first gas mixture flows therein, and a first guide flow path that connects the second separation device and the first connection flow path to each other and guides a second residual gas generated by separating the reference gas from the second gas mixture, from the second separation device to the first connection flow path.

In yet another example, the first gas mixture discharged from the first compressor may be introduced into and cooled by the first heat exchanger and then introduced into the second dehumidifier.

In yet another example, the second gas mixture discharged from the blower may be introduced into and cooled by the first heat exchanger and then introduced into the second separation device.

In yet another example, the liquefier exchanges heat between the cold heat of the fuel passing through the first heat exchanger and the reference gas to cool the reference gas.

In yet another example, the first heat exchanger may exchange heat between the cold heat of the fuel that is vaporizing and the first gas mixture to primarily cool the first gas mixture, exchange heat between the cold heat of the fuel passing through the liquefier and the first gas mixture to secondarily cool the first gas mixture, and introduce the cooled first gas mixture into the first dehumidifier.

In yet another example, the gas capture system may further include a second separation device that separates the reference gas from the second gas mixture discharged from the first separation device, wherein the liquefier liquefies the reference gas discharged from the second separation device, the second separation device is cooled by heat exchange with the cold heat of the fuel passing through the first heat exchanger, and the first separation device is cooled by heat exchange with the cold heat of the fuel passing through the second separation device.

In yet another example, the gas capture system may further include a first pump that suctions the second gas mixture discharged from the first separation device, and a blower that generates flow in which the second gas mixture suctioned through the first pump moves to the second separation device, wherein the first gas mixture discharged from the first compressor is introduced into and cooled by the first heat exchanger and is then introduced into the first dehumidifier, the second gas mixture discharged from the blower is introduced into and cooled by the first heat exchanger and is then introduced into the second separation device, and the first heat exchanger exchanges heat between the cold heat of the fuel passing through the first separation device and the first gas mixture discharged from the first compressor to cool the first gas mixture, and exchanges heat between the cold heat of the fuel passing through the first separation device and the second gas mixture discharged from the blower to cool the second gas mixture.

In yet another example, the gas capture system may further include a third separation device that is connected to the liquefier and separates the reference gas from non-liquefied gases in the liquefier after the non-liquefied gases are introduced into the liquefier, a second connection flow path connecting the second pump and the second compressor, and a second guide flow path that connects the third separation device and the second connection flow path to each other and guides the reference gas separated from the third separation device to the second connection flow path.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
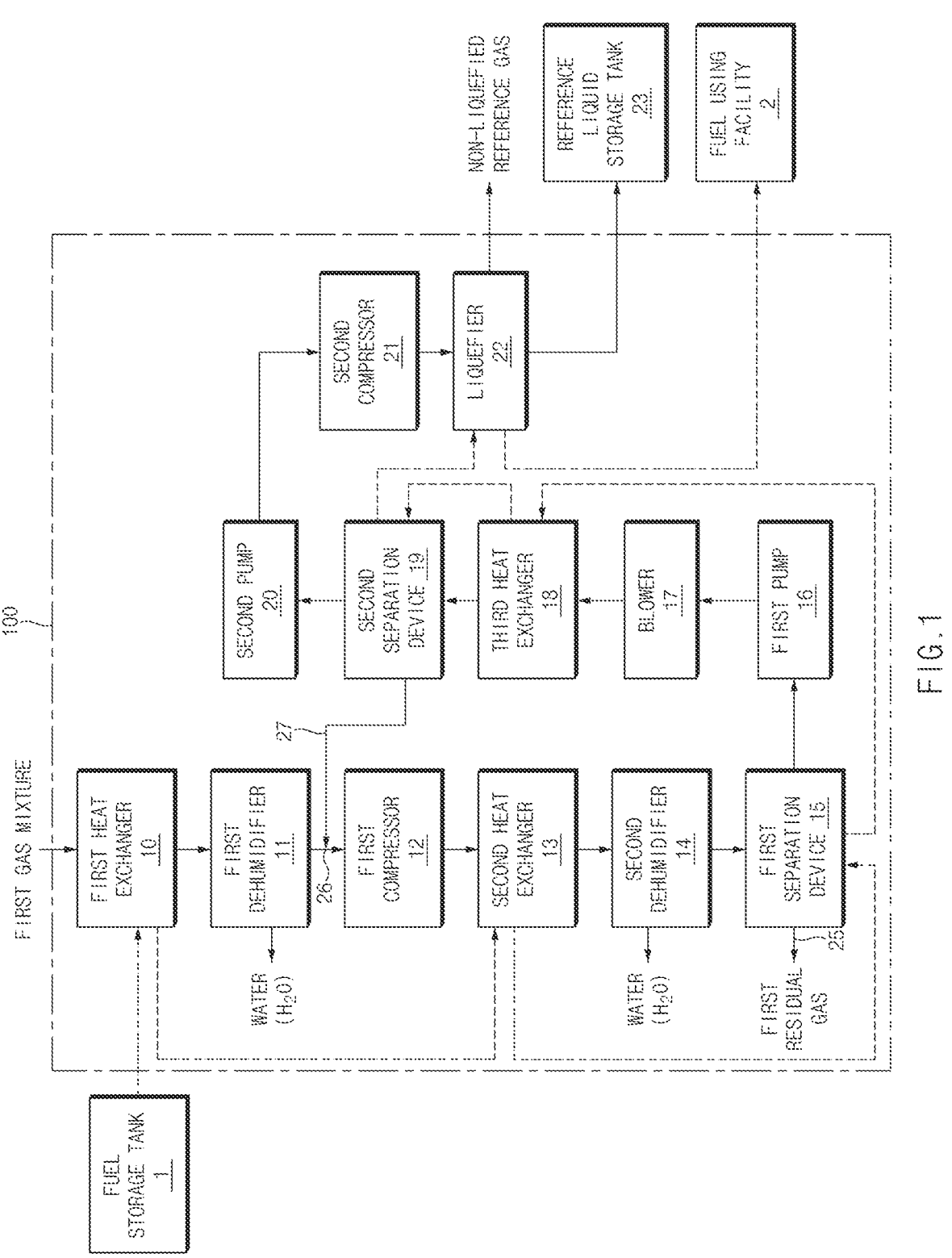
FIG. 1 is a conceptual view illustrating a gas capture system according to a first embodiment of the present disclosure.

Hereinafter, some embodiments of the present disclosure will be described in detail with reference to the exemplary drawings. When components in the drawings are designated by reference numerals, the same components have the same reference numerals as far as possible even though the components are illustrated in different drawings. Further, in description of the embodiments of the present disclosure, when it is determined that a detailed description of a related well-known configuration or function disturbs understanding of the embodiments of the present disclosure, the detailed description will be omitted.

A gas capture system according to the present disclosure may be a system for collecting a reference gas included in a first gas mixture. The reference gas may be carbon dioxide. The first gas mixture may include carbon dioxide, oxygen, nitrogen, water vapor, and the like. As an example, the first gas mixture may be an exhaust gas discharged from power generation facilities or chemical plants using fossil fuels.

Embodiment 1

FIG. 1 is a conceptual view illustrating a gas capture system 100 according to a first embodiment of the present disclosure. The gas capture system 100 according to the first embodiment of the present disclosure may include a first heat exchanger 10, a first dehumidifier 11, a first compressor 12, and a first separation device 15. The first heat exchanger 10 may exchange heat between cold heat of a fuel that is vaporizing and the first gas mixture to cool the first gas mixture. The first heat exchanger 10 may be any one of a double pipe heat exchanger, a compact heat exchanger, a shell-tube heat exchanger, a plate heat exchanger, and a regenerative heat exchanger. This may be equally applied to descriptions of a second heat exchanger 13 and a third heat exchanger 18, which will be described below.

As an example, the fuel may be liquefied natural gas (LNG). The fuel may be stored in a fuel storage tank 1 positioned outside the gas capture system 100. The fuel storage tank 1 may be connected to the first heat exchanger 10. Here, the connection may mean that components are connected to each other through a line through which the fuel may pass therein. Therefore, the cold heat generated when the fuel is vaporized may be exchanged with the first gas mixture to cool the first gas mixture. The fuel discharged from the fuel storage tank 1 may be finally introduced into a fuel using facility 2 via components of the gas capture system 100.

The first dehumidifier 11 may be provided to dehumidify the first gas mixture cooled through the first heat exchanger 10.

The first compressor 12 may press the first gas mixture passing through the first dehumidifier 11. The first compressor 12 may be a component that increases a pressure of the first gas mixture so that separation is performed by the first separation device 15.

The first separation device 15 may separate a second gas mixture including the reference gas from the pressed first gas mixture. The second gas mixture may have a purity of the reference gas, which is higher than that of the first gas mixture. Here, the purity may mean a ratio of the reference gas to the entire gas.

As an example, the first separation device 15 may include a separator. The first separation device 15 may separate the second gas mixture including the reference gas from the first gas mixture through a membrane separation process through the separator.

The gas capture system 100 according to the first embodiment of the present disclosure may further include a liquefier 22. The liquefier 22 may liquefy the reference gas to produce a reference liquid. A process of liquefying the reference gas to produce the reference liquid may be required to store the captured reference gas. The produced reference liquid may be stored in a reference liquid storage tank 23 connected to the liquefier 22. Further, a non-liquefied reference gas may be released to the atmosphere.

According to the present disclosure, the cold heat of the fuel, which is generally discarded, is used to cool and liquefy the gas, and thus energy costs having been used for cooling and liquefying the gas may be reduced.

Figure 2:
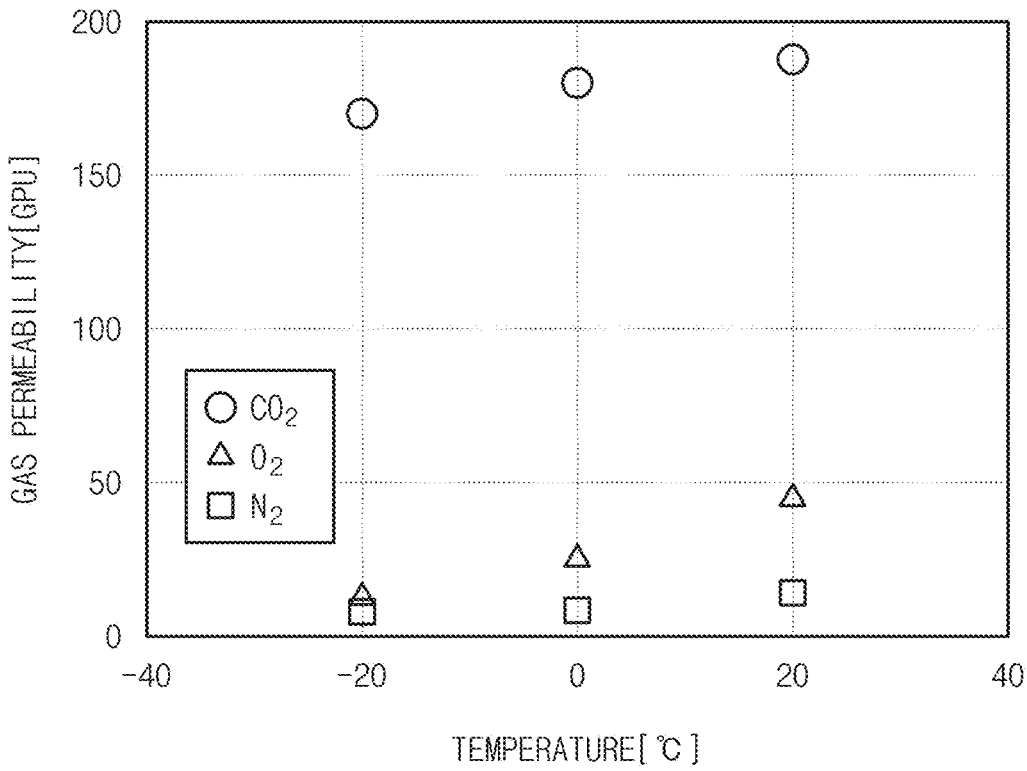
FIG. 2 is a graph comparing gas permeabilities of carbon dioxide, oxygen, and nitrogen according to a temperature.

Meanwhile, when the first gas mixture passes through the first compressor 12, a pressure of air increases, and thus a temperature of the air may increase. FIG. 2 is a graph comparing gas permeabilities of carbon dioxide, oxygen, and nitrogen according to a temperature. In detail, FIG. 2 is a graph illustrating a result of an average value obtained by repeatedly measuring gas permeation performance five times using a separator device capable of adjusting an operating temperature from the room temperature to a low temperature. Further, a mixture gas containing carbon dioxide, oxygen, and nitrogen in a ratio of 20:2:78 was used, an injection flow rate was 0.96 Nm³/hr, an absolute pressure of an injection part was 400 kPa, and an absolute pressure of a permeation part was 40 kPa. A hollow fiber separator made of a polysulfone-based polymer was used as the separator.

Referring to FIG. 2, it may be identified that, as a temperature of the membrane separation process is decreased, permeation performances of the carbon dioxide, the oxygen, and the nitrogen are decreased. However, a permeability decreasing effect appears more strongly in the oxygen and the nitrogen as compared to the carbon dioxide. When the temperature of the membrane separation process is decreased from 20 degrees to −20 degrees, the permeability of the carbon dioxide is decreased by about 10%, while the permeabilities of the oxygen and the nitrogen are decreased by about 70%. As a result, selectivity of the carbon dioxide to the oxygen and a selectively of the carbon dioxide to the nitrogen may be improved by about three times or more. In conclusion, when the temperature of the membrane separation process is decreased, a purity of the obtained carbon dioxide may be improved.

Hereinafter, a component for decreasing the temperature of the membrane separation process generated in the first separation device 15 will be described in detail. The gas capture system 100 according to the first embodiment of the present disclosure may further include the second heat exchanger 13 and a second dehumidifier 14.

The second heat exchanger 13 may exchange heat between the cold heat of the fuel passing through the first heat exchanger 10 and the first gas mixture discharged from the first compressor 12 to cool the first gas mixture. To this end, the first heat exchanger 10 and the second heat exchanger 13 may be connected to each other. As the second heat exchanger 13 cools the first gas mixture, a temperature of the first gas mixture introduced into the membrane separation process is decreased, and thus the purity of the reference gas may be increased. The first gas mixture passing through the second heat exchanger 13 may be introduced into the second dehumidifier 14.

The second dehumidifier 14 may dehumidify the first gas mixture discharged from first compressor 12. The first gas mixture cooled by the second heat exchanger 13 may be introduced into and dehumidified by the second dehumidifier 14. The first gas mixture passing through the second dehumidifier 14 may be introduced into the first separation device 15.

The first separation device 15 may be cooled by heat exchange with the cold heat of the fuel passing through the second heat exchanger 13. For example, a line may be formed such that the fuel passes through a vicinity of the separator or a line may be formed to pass through a vicinity of a pipe that guides the first gas mixture to the separator. The lines are illustrated as dotted lines in the drawings.

Meanwhile, as compared to a case in which the membrane separation process is performed once, when the membrane separation process is performed twice, the purity of the reference gas in the gas mixture may be further increased. Hereinafter, components for performing the membrane separation process once more will be described in detail.

The gas capture system 100 according to the first embodiment of the present disclosure may further include a second separation device 19. The second separation device 19 may separate the reference gas from the second gas mixture discharged from the first separation device 15. The second separation device 19 may also include a separator. The liquefier 22 may be provided to liquefy the reference gas discharged from the second separation device 19.

Meanwhile, the aspect that the reference gas is separated from the second gas mixture is considered as a concept that does not mean only a state in which only the reference gas remains but also a state in which a certain amount of different gases are separated together in the separation process. When the second gas mixture passes through the second separation device 19, the purity of the reference gas may be further increased as compared to the second gas mixture passing through the first separation device 15.

The gas capture system 100 according to the first embodiment of the present disclosure may further include a first pump 16 and a blower 17. The first pump 16 may suction the second gas mixture discharged from the first separation device 15. The blower 17 may generate flow in which the second gas mixture suctioned through the first pump 16 moves to the second separation device 19.

Meanwhile, the gas capture system 100 according to the first embodiment of the present disclosure may further include the third heat exchanger 18. The third heat exchanger 18 may cool the second gas mixture discharged from the blower 17. The second gas mixture cooled by the third heat exchanger 18 may be introduced into the second separation device 19.

The third heat exchanger 18 may exchange heat between the cold heat of the fuel passing through the first separation device 15 and the second gas mixture to cool the second gas mixture. To this end, the third heat exchanger 18 may be connected to the first separation device 15.

The second separation device 19 may be cooled by heat exchange with the cold heat of the fuel passing through the third heat exchanger 18. To this end, the second separation device 19 may be connected to the third heat exchanger 18.

The liquefier 22 may exchange heat between the cold heat of the fuel passing through the second separation device 19 and the reference gas to cool the reference gas. To this end, the liquefier 22 may be connected to the second separation device 19. The fuel passing through the liquefier 22 may be supplied to the fuel using facility 2 outside the gas capture system 100.

The gas capture system 100 according to the first embodiment of the present disclosure may include a second pump 20 and a second compressor 21. The second pump 20 may suction the reference gas discharged from the second separation device 19. The second compressor 21 may press the reference gas suctioned from the second pump 20. The reference gas passing through the second compressor 21 may be introduced into the liquefier 22. The second compressor 21 may press the reference gas to a pressure for liquefaction.

Meanwhile, a residual gas except for the reference gas in the first gas mixture needs to be discharged to the outside. Hereinafter, a component for discharging the residual gas except for the reference gas to the outside will be described in detail.

The gas capture system 100 according to the first embodiment of the present disclosure may further include a first discharge flow path 25. The first discharge flow path 25 may be connected to the first separation device 15 to guide a first residual gas to the outside. The first residual gas may be a gas generated by separating the second gas mixture from the first gas mixture.

The gas capture system 100 according to the first embodiment of the present disclosure may include a first connection flow path 26 and a first guide flow path 27. The first connection flow path 26 may be a flow path which connects the first dehumidifier 11 and the first compressor 12 and into which the first gas mixture is introduced.

The first guide flow path 27 may connect the second separation device 19 and the first connection flow path 26 to each other. The first guide flow path 27 may guide a second residual gas from the second separation device 19 to the first connection flow path 26. The second residual gas may mean a gas remaining after the reference gas is separated from the second gas mixture. The second residual gas introduced into the first connection flow path 26 may pass through the first separation device 15 and may be discharged to the outside through the first discharge flow path 25.

A process of collecting the reference gas by the gas capture system 100 according to the first embodiment of the present disclosure will be described in detail with reference to the above components.

First, the first gas mixture is introduced into and cooled by the first heat exchanger 10 and is then introduced into the first separation device 15 via the first dehumidifier 11, the first compressor 12, the second heat exchanger 13, and the second dehumidifier 14. In this process, the first gas mixture is separated into the first residual gas and the second gas mixture. The first residual gas is discharged to the outside through the first discharge flow path 25.

The second gas mixture is separated into the reference gas and the second residual gas through the first pump 16, the blower 17, the third heat exchanger 18, and the second separation device 19. The second residual gas is guided to the first connection flow path 26 through the first guide flow path 27, and the reference gas is introduced into the liquefier 22 through the pump 20 and the second compressor 21.

The liquefier 22 liquefies the reference gas to produce the reference liquid. The reference liquid is stored in the reference liquid storage tank 23, and the non-liquefied reference gas is discharged to the outside.

Embodiment 2

Figure 3:
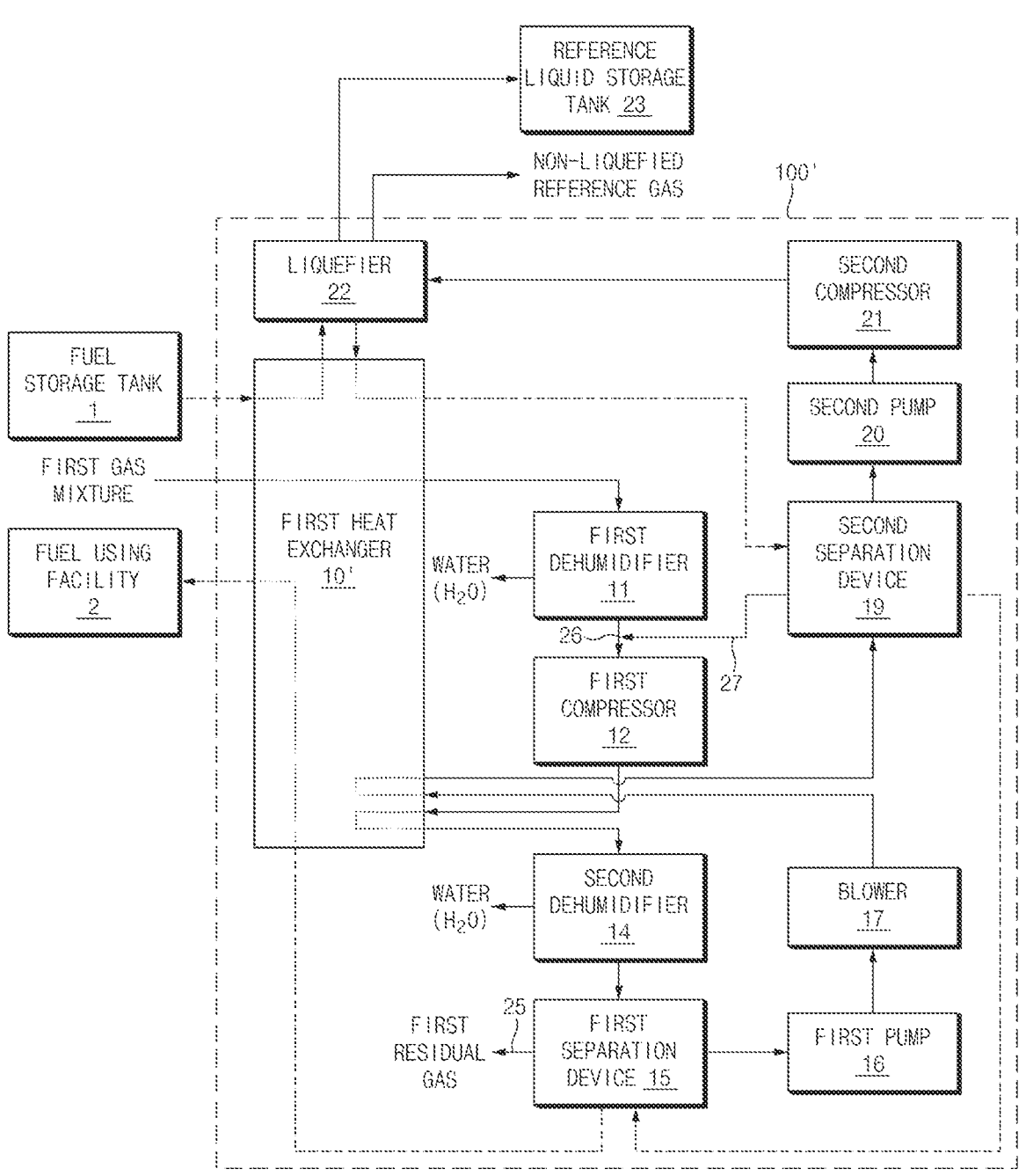
FIG. 3 is a conceptual view illustrating a gas capture system according to a second embodiment of the present disclosure.

FIG. 3 is a conceptual view illustrating a gas capture system according to a second embodiment of the present disclosure. Hereinafter, a gas capture system 100' according to the second embodiment of the present disclosure will be described in detail with reference to FIG. 3. The gas capture system 100' according to the second embodiment of the present disclosure differs from the gas capture system 100 according to the first embodiment in terms of a structure of the heat exchanger. The same or equivalent components as those of the gas capture system 100 according to the first embodiment are designated by the same or equivalent reference numerals, and a detailed description thereof will be omitted.

A first heat exchanger 10' of the gas capture system 100' according to the second embodiment of the present disclosure may have a multi-stream heat exchanger structure. This may be understood as a structure in which all heat exchange is performed through the first heat exchanger 10' instead of the second heat exchanger 13 and the third heat exchanger 18 according to the first embodiment.

The liquefier 22 of the gas capture system 100' according to the second embodiment of the present disclosure may exchange heat between the cold heat of the fuel passing through the first heat exchanger 10' and the reference gas to cool the reference gas. The first heat exchanger 10' may exchange heat between the cold heat of the vaporizing fuel and the first gas mixture to primarily cool the first gas mixture and exchange heat between the cold heat of the fuel passing through the liquefier 22 and the first gas mixture to secondarily cool the first gas mixture so that the secondarily cooled first gas mixture may be introduced into the first dehumidifier 11. To this end, the fuel storage tank 1 may be connected to the first heat exchanger 10', the first heat exchanger 10' may be connected to the liquefier 22, and the liquefier 22 may be connected to the first heat exchanger 10' in turn. That is, the first heat exchanger 10' and the liquefier 22 may be connected through two lines.

The second separation device 19 may be cooled by heat exchange with the cold heat of the fuel passing through the first heat exchanger 10'. The second separation device 19 may be connected to the first heat exchanger 10'. The first separation device 15 may be cooled by heat exchange with the cold heat of the fuel passing through the second separation device 19. The first separation device 15 may be connected to the second separation device 19. The fuel passing through the first separation device 15 may be introduced into the fuel using facility 2 via the first heat exchanger 10'.

Meanwhile, the first gas mixture discharged from the first compressor 12 may be introduced into and cooled by the first heat exchanger 10' and then introduced into the second dehumidifier 14. As an example, the first heat exchanger 10' may exchange heat between the cold heat of the fuel passing through the first separation device 15 and the first gas mixture discharged from the first compressor 12 to cool the first gas mixture.

Further, the second gas mixture discharged from the blower 17 may be introduced into and cooled by the first heat exchanger 10' and then introduced into the second separation device 19. As an example, the first heat exchanger 10' may exchange heat between the cold heat of the fuel passing through the first separation device 15 and the second gas mixture discharged from the blower 17 to cool the second gas mixture.

Embodiment 3

Figure 4:
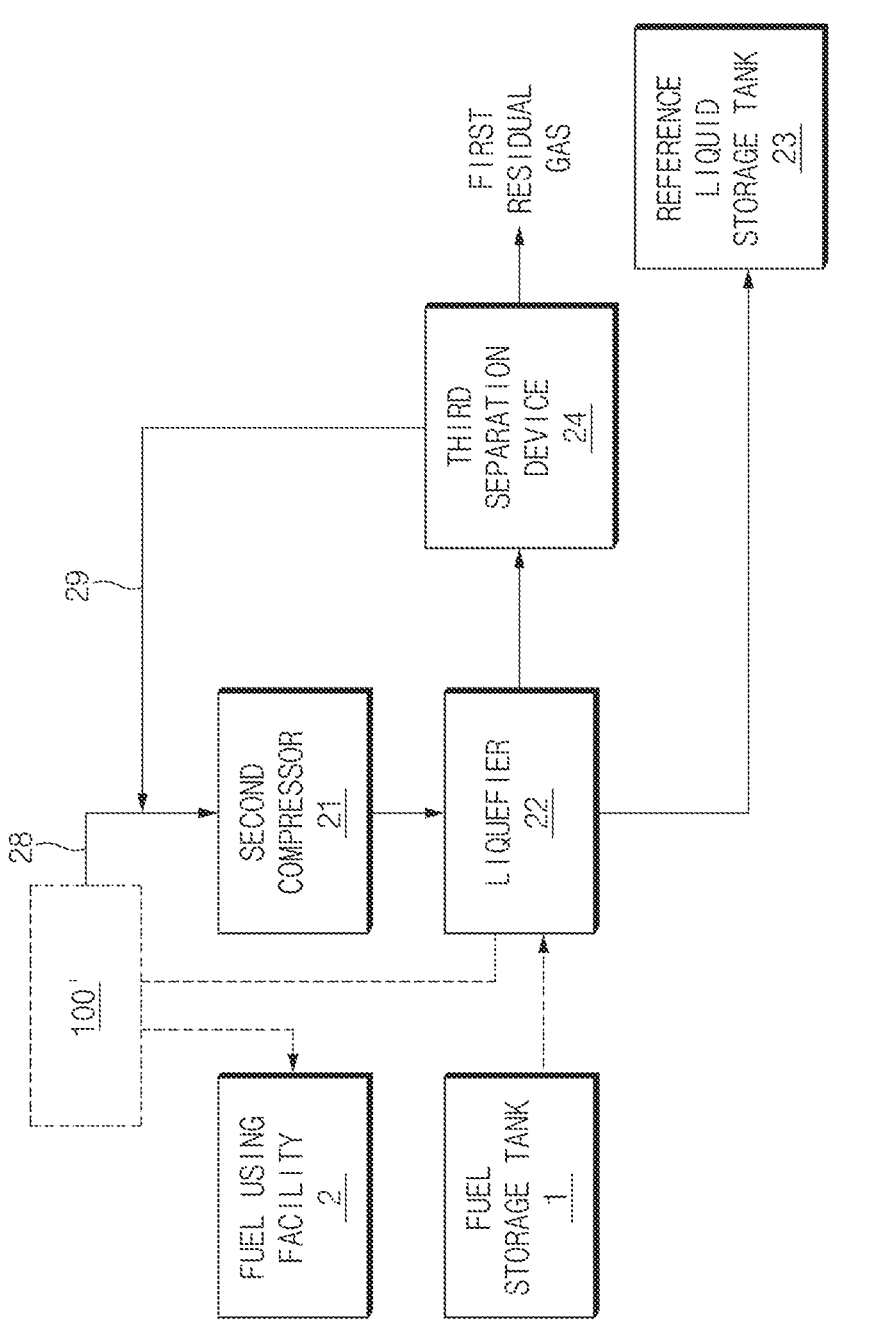
FIG. 4 is a conceptual view illustrating a gas capture system according to a third embodiment of the present disclosure.

FIG. 4 is a view illustrating a gas capture system according to a third embodiment of the present disclosure. Hereinafter, the gas capture system according to the third embodiment will be described in detail with reference to FIG. 4. The gas capture system according to the third embodiment of the present disclosure differs from the gas capture system according to the second embodiment in that the membrane separation process is performed once more. The same or equivalent components as those of the gas capture system according to the second embodiment are designated by the same or equivalent reference numerals, and a detailed description thereof will be omitted. Meanwhile, as an example, FIG. 4 illustrates a state in which additional components are added to the gas capture system according to the second embodiment, but components, which will be described below, may be added to the gas capture system according to the first embodiment to increase the purity of the reference gas.

The gas capture system according to the third embodiment may further include a third separation device 24, a second connection flow path 28, and a second guide flow path 29. The third separation device 24 may be connected to the liquefier 22 and may separate the reference gas from the non-liquefied gas that is introduced into the liquefier 22 and is then present in the liquefier 22. As described above, even after the second gas mixture passes through the second separation device 19, a small amount of other types of gases may be present together with the reference gas. The third separation device 24 may separate the reference gas therefrom once more.

The second connection flow path 28 may connect the second pump 20 and the second compressor 21 and may be provided such that the reference gas passes through an inside thereof. Here, the aspect that the reference gas passes may mean that a small amount of other types of gases described above may also pass.

The second guide flow path 29 may connect the third separation device 24 and the second connection flow path 28 to each other to guide the reference gas separated from the third separation device 24 to the second connection flow path 28. The reference gas guided to the second connection flow path 28 may be introduced into the liquefier 22 and subjected to a liquefaction process once more.

According to the gas capture system according to the third embodiment of the present disclosure, since the non-liquefied reference gas is introduced into the liquefier 22 once again and is subjected to the liquefaction process, the amount of the captured reference gas may be increased.

According to the present disclosure, the cold heat of the fuel, which is generally discarded, is used to cool and liquefy the gas, and thus energy costs having been used for cooling and liquefying the gas may be reduced.

The above description is merely illustrative of the technical spirit of the present disclosure, and those skilled in the art to which the present disclosure belongs may make various modifications and changes without departing from the essential features of the present disclosure. Thus, the embodiments disclosed in the present disclosure are not intended to limit the technology spirit of the present disclosure, but are intended to describe the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

The invention claimed is:

1. A gas capture system comprising:
a first heat exchanger configured to cool a first gas mixture by exchanging heat between cold heat of a fuel that is vaporizing and the first gas mixture;
a first dehumidifier configured to dehumidify the first gas mixture cooled through the first heat exchanger;
a first compressor configured to press the first gas mixture passing through the first dehumidifier;
a first separation device configured to separate a second gas mixture including a reference gas from the pressed first gas mixture;
a liquefier configured to liquefy the reference gas to generate a reference liquid; and
a first discharge flow path connected to the first separation device and configured to guide, to an outside, a first residual gas generated by separating the second gas mixture from the first gas mixture.

2. The gas capture system of claim 1, further comprising:
a second dehumidifier configured to dehumidify the first gas mixture discharged from the first compressor,
wherein the first gas mixture passing through the second dehumidifier is introduced into the first separation device.

3. The gas capture system of claim 2, further comprising:
a second heat exchanger configured to exchange heat between the cold heat of the fuel passing through the first heat exchanger and the first gas mixture discharged from the first compressor to cool the first gas mixture.

4. The gas capture system of claim 3, wherein the first separation device is cooled by heat exchange with the cold heat of the fuel passing through the second heat exchanger.

5. The gas capture system of claim 1, further comprising:
a second separation device configured to separate the reference gas from the second gas mixture discharged from the first separation device,
wherein the liquefier is configured to liquefy the reference gas discharged from the second separation device.

6. The gas capture system of claim 5, further comprising:
a first pump configured to suction the second gas mixture discharged from the first separation device; and
a blower configured to generate flow in which the second gas mixture suctioned through the first pump to the second separation device.

7. The gas capture system of claim 6, further comprising:
a third heat exchanger configured to cool the second gas mixture discharged from the blower,
wherein the second gas mixture cooled by the third heat exchanger is introduced into the second separation device.

8. The gas capture system of claim 7, further comprising:

a second heat exchanger configured to exchange heat between the cold heat of the fuel passing through the first heat exchanger and the first gas mixture discharged from the first compressor to cool the first gas mixture, wherein the first separation device is cooled by heat exchange with the cold heat of the fuel passing through the second heat exchanger, and the third heat exchanger is configured to exchange heat between the cold heat of the fuel passing through the first separation device and the second gas mixture to cool the second gas mixture.

9. The gas capture system of claim 8, wherein the second separation device is cooled by heat exchange with the cold heat of the fuel passing through the third heat exchanger, and the liquefier is configured to exchange heat between the cold heat of the fuel passing through the second separation device and the reference gas to cool the reference gas.

10. The gas capture system of claim 6, further comprising:

a second pump configured to suction the reference gas discharged from the second separation device; and a second compressor configured to press the reference gas suctioned through the second pump, wherein the reference gas passing through the second compressor is introduced into the liquefier.

11. The gas capture system of claim 5, further comprising:

a first connection flow path which connects the first dehumidifier and the first compressor and through which the first gas mixture flows; and a first guide flow path connecting the second separation device and the first connection flow path to each other and configured to guide a second residual gas generated by separating the reference gas from the second gas mixture, from the second separation device to the first connection flow path.

12. The gas capture system of claim 2, wherein the first gas mixture discharged from the first compressor is introduced into and cooled by the first heat exchanger, and is then introduced into the second dehumidifier.

13. The gas capture system of claim 6, wherein the second gas mixture discharged from the blower is introduced into and cooled by the first heat exchanger, and is then introduced into the second separation device.

14. The gas capture system of claim 1, wherein the liquefier is configured to exchange heat between the cold heat of the fuel passing through the first heat exchanger and the reference gas to cool the reference gas.

15. The gas capture system of claim 14, wherein the first heat exchanger exchanges heat between the cold heat of the fuel that is vaporizing and the first gas mixture to primarily cool the first gas mixture, exchanges heat between the cold heat of the fuel passing through the liquefier and the first gas mixture to secondarily cool the first gas mixture, and introduces the cooled first gas mixture into the first dehumidifier.

16. The gas capture system of claim 15, further comprising:

a second separation device configured to separate the reference gas from the second gas mixture discharged from the first separation device;

wherein the liquefier is configured to liquefy the reference gas discharged from the second separation device;

wherein the second separation device is cooled by heat exchange with the cold heat of the fuel passing through the first heat exchanger; and wherein the first separation device is cooled by heat exchange with the cold heat of the fuel passing through the second separation device.

17. The gas capture system of claim 16, further comprising:

a first pump configured to suction the second gas mixture discharged from the first separation device; and a blower configured to generate flow in which the second gas mixture suctioned through the first pump moves to the second separation device;

wherein the first gas mixture discharged from the first compressor is introduced into and cooled by the first heat exchanger and is then introduced into the first dehumidifier;

wherein the second gas mixture discharged from the blower is introduced into and cooled by the first heat exchanger and is then introduced into the second separation device; and wherein the first heat exchanger exchanges heat between the cold heat of the fuel passing through the first separation device and the first gas mixture discharged from the first compressor to cool the first gas mixture, and exchanges heat between the cold heat of the fuel passing through the first separation device and the second gas mixture discharged from the blower to cool the second gas mixture.

18. The gas capture system of claim 10, further comprising:

a third separation device connected to the liquefier and configured to separate the reference gas from non-liquefied gases in the liquefier after the non-liquefied gases are introduced into the liquefier;

a second connection flow path connecting the second pump and the second compressor; and a second guide flow path connecting the third separation device and the second connection flow path to each other and configured to guide the reference gas separated from the third separation device to the second connection flow path.

* * * * *